United States Patent
Eguchi et al.

(12)

(10) Patent No.: US 6,214,382 B1
(45) Date of Patent: Apr. 10, 2001

(54) HYDROPHILIC FILM AND PROCESS FOR PRODUCING THE SAME

(76) Inventors: Tamiyuki Eguchi, 14-5 Koeidai 5-chome, Kita-ku, Kobe-shi, Hyogo 651-11 (JP); Kiyoshi Ando, 3-15-1-303, Settsu-shi, Osaka 560 (JP); Yasuo Shimizu, 2-27, Minami-machi 2-chome, Suzurandai, Kita-ku, Kobe-shi, Hyogo 651-11 (JP)

( * ) Notice: Subject to any disclaimer, the term of this patent is extended or adjusted under 35 U.S.C. 154(b) by 0 days.

(21) Appl. No.: 08/836,049

(22) PCT Filed: Nov. 14, 1995

(86) PCT No.: PCT/JP95/02316

§ 371 Date: Dec. 23, 1997

§ 102(e) Date: Dec. 23, 1997

(87) PCT Pub. No.: WO96/14922

PCT Pub. Date: May 23, 1996

(Under 37 CFR 1.47)

(30) Foreign Application Priority Data

Nov. 16, 1994 (JP) ................................... 6-308300

(51) Int. Cl.[7] .................................... A61K 9/14
(52) U.S. Cl. ................ 424/484; 424/402; 424/78.1; 424/78.08; 424/486

(58) Field of Search .................................. 424/488, 489, 424/485, 486, 402

(56) References Cited

U.S. PATENT DOCUMENTS 4,794,002 * 12/1988 Henis et al. ......................... 424/488
5,139,881   8/1992 Henis et al. .

FOREIGN PATENT DOCUMENTS 56-16187   4/1981 (JP) .
2-298326  12/1990 (JP) .

* cited by examiner

*Primary Examiner*—Thurman K. Page
*Assistant Examiner*—William E. Benston, Jr.
(74) *Attorney, Agent, or Firm*—Armstrong, Westerman, Hattori, McLeland & Naughton

(57) ABSTRACT

This invention provides a hydrophilic membrane wherein a hydrophilic cellulose derivative of a number average molecular weight of 2000~8000 is adsorbed irreversibly to a hydrophobic membrane of an aromatic polymer.

Since an amount of leaching substances is extremely small, the membrane can be used suitably in such fields as medical applications, electronics, etc. where even a quite small quantity of leaching substances from the membranes is limited especially small.

9 Claims, No Drawings

HYDROPHILIC FILM AND PROCESS FOR PRODUCING THE SAME

TECHNICAL FIELD

This invention relates to a hydrophilic membrane which can be obtained by making a hydrophobic membrane of an aromatic polymer hydrophilic and a method for producing it, and especially it relates to a hydrophilic membrane which is suitable for use in filtration such as a micro- filtration membrane, an ultra filtration membrane, a membrane for medical uses, etc. where any leaching from membranes is required to be limited especially small.

BACKGROUND ART

The method, where a hydrophobic membrane is made hydrophilic by adhering a hydrophilic polymer on a hydrophobic membrane through a process of first impregnating a hydrophobic membrane with a hydrophilic polymer solution, second eliminating this solvent by drying, is well known for a long time, and it may be said that this method is tried for almost all known hydrophilic polymers. Also, it is well known that cellulose derivatives can be used as a hydrophilic polymer. For examples, Examined Japanese Patent (JPB-56-16187(1981)) disclosed uses of methyl cellulose, ethyl cellulose, hydroxy ethyl cellulose and hydroxy propyl cellulose, and Unexamined Japanese Patent (JPA-62-176508(1987)) disclosed a use of hydroxy propyl cellulose of the molecular weight of not less than 10000.

Prior arts have put emphasis on points of making the hydrophobic membranes hydrophilic or making the hydrophilic polymer insoluble, and the arts to prevent leaching of even a quite small amount of the hydrophilic polymer have not sufficiently been studied. However, in fields of medical applications, electronics, etc., since even a quite small quantity of leaching substances from the membranes causes an important problem, it quite often happens that even a quite small quantity of leaching substances from the membranes is avoided essentially, and there are many cases of the prior arts cannot respond sufficiently to these requirements.

The cellulose derivatives used for making the hydrophobic membrane hydrophilic are produced by a chemical modification of a powder-like or flake-like cellulose. Therefore, some cellulose does not completely dissolve and stays in a dispersed state, and, thus, it may result that there is some chemically unmodified cellulose. In the case where the hydrophobic membrane is impregnated with a solution which contains such insufficiently modified cellulose derivatives, it may happen that not only a part of cellulose derivatives which does not dissolve completely clogs pores of the membrane, but the cellulose derivatives may leach out under such a severe condition as a sterilization by autoclaving, since the chemically insufficiently modified cellulose does not adhere molecularly and irreversibly to the surface of the hydrophobic membrane after drying (which means that the molecules once adhered do not detach from the hydrophobic membrane by dissolving again in water).

The subject of this invention is not only to make a hydrophobic membrane hydrophilic but also to provide a hydrophilic membrane from which a leaching substance is reduced as little as possible and which can be used suitably in such fields as medical applications, electronics, etc. where even a quite small quantity of a leaching substance from membranes is prohibited.

DISCLOSURE OF THE INVENTION

This invention is, in a first aspect, to provide a hydrophilic membrane wherein a hydrophilic cellulose derivative of a number average molecular weight between 2000~8000 is adsorbed irreversibly to a hydrophobic membrane of an aromatic polymer.

This invention is, in a second aspect, to provide a method of producing a hydrophilic membrane wherein a hydrophobic membrane is first impregnated with a solution of a hydrophilic cellulose derivative of a number average molecular weight between 2000~8000 and then the impregnated membrane is washed.

BEST MODE FOR CARRYING OUT THE INVENTION

This invention is to produce the hydrophilic membrane, which has a quite small amount of a leaching substance from the membrane, by adsorbing irreversibly to the hydrophobic membrane a hydrophilic cellulose derivative from which components which do not dissolve completely in a solvent are beforehand removed of by the fractionation. Though a filtration of a hydrophilic cellulose derivative solution is considered to be used as a usual method for removing insoluble parts of the cellulose derivative, this method is not an effective method, since the clogging of a filter does occur unexpectedly soon and the insoluble parts smaller than the pore of a filter remain in the filtrate.

Therefore, for removing of insoluble parts, this invention uses the fractionation where a poor solvent is used, which is usually used in the fractionation of polymers by a molecular weight (hereafter, called as the fractionation). According to this method, since insoluble parts precipitate as a large aggregate with higher molecular weight components, the insoluble parts can be surely removed.

As the hydrophilic cellulose derivatives, methyl cellulose, carboxy methyl cellulose, low substituted hydroxy propyl cellulose or hydroxy propyl methyl cellulose are preferable, and these are used individually or in combination of two or more.

These compounds are easy to handle, since these hydrophilic cellulose derivatives dissolve in water or in an aqueous alkali solution. On the solvents used in the fractionation for removing insoluble parts from these derivatives, there are no special limits and, for examples, either of water, ethanol, an aqueous solution of ethanol or ethanollan aqueous alkali solution can be used preferably. Further, it is well known that a molecular weight of a fraction can be adjusted by changing a solubility of the solvent. A large aggregate precipitated by a fractionation can be filtered off by using a filtration paper, but the components, which do not contain insoluble parts, can be also obtained by taking a supernatant in the case that large aggregates precipitate. The number average molecular weight of cellulose derivatives, which can be commercially available, is about 10,000~300,000 (See, for example, item on hydroxy propyl methyl cellulose in Japan Pharmacopoeia). Since the insoluble parts increase as the molecular weight increases, it is preferable to use a cellulose derivative of a molecular weight as small as possible as a starting material before the fractionation. A cellulose derivative of a molecular weight between 2,000 and 8,000 can be obtained by removing insoluble parts from such a starting material through use of the above mentioned fractionation.

The hydrophobic membranes used in this invention are composed of an individual or a combination of more than two of aromatic polymers such as aromatic polyethers, aromatic polyesters, aromatic polyamides or aromatic polysulfones. However, aromatic polysulfones such as a polyethersulfone or a polyarylethersulfone is preferable from points that the polysulfones are superior in the essential properties such as anti-chemicals, mechanical strength, heat resistance and filtration.

The Unexamined Japanese Patent (JPA-62-176508 (1987)) mentions that a hydroxy propyl cellulose of an average molecular weight not less than 10,000 must be used because the hydroxy propyl group is an effective hydrophobic bond group, but-, since, according to studies of present invention, a methyl cellulose, a hydroxy propyl methyl cellulose and a low substituted hydroxy propyl cellulose, which contains about 1/10 of hydroxy propyl group compared with the usual hydroxy propyl cellulose, can be adsorbed more strongly to a hydrophobic membrane than the usual hydroxy propyl cellulose, the hydrophobic group bond to aromatic groups can be considered to be a glucose group itself which constitutes a skeleton of cellulose. Though the hydroxy propyl group gives a hydrophilic property as well as the methoxy group, it may be considered that the hydroxy propyl group may prevent the hydrophobic bond to the polysulfone.

Therefore, in this invention, it is preferable to use a cellulose derivative, the substitution range of which is not more than 40% for giving a strong irreversible hydrophobic bond and not less than 10% for giving a hydrophilic property. By using such cellulose derivatives of the abovementioned substitution degree, the polysulfone strongly adsorbs the cellulose derivatives through an irreversible adsorption and is given a hydrophilic property, even if the cellulose derivative of below 10,000 molecular weight is used. However, in the case of lower than 2,000, the strength of the hydrophobic bond decreases.

Since, in this invention, the cellulose derivatives of a low molecular weight is used, they can be used effectively to a membrane of a not less than 0.01 $\mu$m pore size without lowing of a filtration speed. Here, the membrane can be used as a hollow fiber or a film-like form.

A cellulose derivative is irreversibly adsorbed to the hydrophobic membrane by impregnating a hydrophobic membrane with a hydrophilic polymer solution. The solvents, which can be used in this process, can be the same as mentioned before. However, water and an aqueous alkali solution can be used preferably. In order to impregnate smoothly, a small amount of alcohols such as ethanol can be added. The concentration of a cellulose derivative is about 50~1000 ppm. In the case of below 50 ppm, there is a possibility that all the surface of the membrane can not be covered with the cellulose derivative and the use of more than 1000 ppm is meaningless, because adsorption is not accelerated even if the concentration increases. In the Unexamined Japanese Patent (JPA-62-176508(1987)) mentioned before, a hydrophobic membrane is contacted with a cellulose derivative solution for more than several hours. However, in this invention, this contact time between not less than about ten minutes and not more than two hours is sufficient, since adsorption speed is very large due to the use of the cellulose derivatives having a low molecular weight and a large bonding force.

When a hydrophobic membrane is impregnated, a simple immersion into the cellulose derivative solution is sufficient in the case where the hydrophobic membrane is wet. While in the case of the membrane being dry, the solution is pressurized to immerse into the membrane. A preferable temperature of the solution is between room temperature and 50° C., since a solubility of the cellulose derivatives to water becomes lower about not less than 60° C.

After all the surfaces of the hydrophobic membrane adsorbed the cellulose derivative, an excessive cellulose derivative is removed by washing with use of the same solvent at a temperature of between room temperature and 50° C. When the solvent is an aqueous alkali solution, a further washing by water is done. The membrane can be dried, if necessary. The dried membrane has such a hydrophilic property as it is wetted by water naturally.

It is confirmed by a bubble point method (for example, see JIS K 3833) or a diffusion flow of air (for example, see JIS K 3833) whether all the surface of a hydrophobic membrane adsorbs a cellulose derivative and has become hydrophilic. Further, it is confirmed by a filtration speed (for example, see JIS K 3831) whether pores of a hydrophobic membrane are clogged with a cellulose derivative. The hydrophilic membrane by this invention is completely hydrophilic and its pores are never clogged with a cellulose derivative.

The leaching substances from the obtained hydrophilic membrane can be confirmed, for example, by the testing method of a plastic vessel for a transfusion liquid described in Japan Pharmacopoeia or by measuring a total concentration of an organic carbon (TOC) in the leaching liquid. It is confirmed that the leaching substances from the membrane by this invention are quite little.

The invention will be described in more detail with reference to the following examples, which are not intended to restrict the scope of the invention.

EXPERIMENTAL EXAMPLE 1

(1) Collection of a low molecular weight hydroxy propyl methyl cellulose fraction Ten weight % of a hydroxy propyl methyl cellulose commercially available, which had a number average molecular weight of about 11000, 29% methoxy and 9% hydroxy propyl groups (hereafter, called as HPMC), was dispersed in ethanol and left for a whole day and night. By separating a transparent supernatant, an HPMC of a number average molecular weight of 2500 was fractionally obtained. By use of ethanol which contains a little amount of water as a dispersion liquid, an HPMC of a number average molecular weight of 7500 was fractionally obtained in the similar manner.

(2) Test for confirming an effect of removing insoluble parts

The 1000 ppm aqueous solutions of the above obtained three kind of HPMC were filtered by a filter of 0.04 $\mu$m. The filtering pressure became twice in one minute in the case of the raw HPMC aqueous solution, while the filtering pressure did not increase even after one hour in the case of the other two aqueous solutions. Thus, it was confirmed that insoluble parts had been removed.

EXAMPLE 1

(1) Preparation of a hydrophilic hollow fiber membrane

A solution containing 20 weight % of a polyarylethersulfone( produced by Teijin and Amoco Engineering Plastics Limited. Co., P-3500) and 80 weight % of dimethylsulfoxide, which was kept at 70° C., was extruded into an air through a double tube-like nozzle with a solution of propylene glycol containing a little amount of water, and was wound up after being immersed into a warm water located 10 cm below the nozzle. Thus, a hollow fiber, which had a 200 $\mu$m inner diameter, a 260 $\mu$m outer diameter and a 0.02 $\mu$m pore size, was obtained. A bundle of 8000 hollow fibers, 30 cm in length was washed with a hot water until a residue of dimethylsulfoxide became about 1 ppm. Immediately after impregnating a bundle of hollow fibers with an aqueous solution containing 500 ppm HPMC of a number average molecular weight of 2500 at 40° C. for one hour by showering, the HPMC aqueous solution was washed out by showering water at 50° C. for one hour. This bundle of hollow fibers was dried at 90° C.

(2) Measurement of leaching substances from the hydrophilic hollow fibers membrane A measurement of leaching substances from the hydrophilic hollow fibers membrane obtained in above described Example 1 was done according to the testing method of a plastic vessel for a transfusion liquid described in Japan Pharmacopoeia. An amount of a consumed potassium permanganate of the leaching liquid was measured. It was 0.4 ppm and was in the range of the regulation. Further, its TOC was 3 ppm. These data showed that an amount of the leaching substances was quite small.

(3) Measurement of filtering speed

A filtering speed of the hydrophilic hollow fibers membrane obtained in the above-described Example 1 was measured by the method described below. A module of a 18 cm effective length was prepared by fixing the both bundle ends of hydrophilic hollow fibers with an urethane resin through the use of a well known method. Another module was prepared with use of hydrophobic hollow fibers which were completely same as hydrophilic fibers except that the hydrophobic fibers were not treated by cellulose derivatives. The filtering speed for water of the former module was almost the same as that of the latter. Here, the filtering speed for water of the latter was measured after filtration of an aqueous solution of ethanol. Thus, it was confirmed that pores of the hydrophobic membrane which was made hydrophilic with HPMC was not clogged.

(4) Measurement of diffusion flow of air

Taking an account of the fact that an amount of a diffusion flow of air was not more than 15 ml/minute under conditions that an outside of hollow fibers in the hydrophilic hollow fiber module was pressurized with air at 300 kilo pascal after a passage of water described above was measured, it was judged that the all the surfaces of the hollow fibers adsorbed the HPMC.

EXAMPLE 2

The same evaluations were done in the same manner as in Example 1 except that the HPMC of a number average molecular weight of 7500 was used. The similar results as in Example 1 were obtained.

COMPARATIVE EXAMPLE 1

The same evaluations were done in the same manner as in Example 1 except that the raw HPMC was used. A amount of a consumed potassium permanganate of a filtrate was measured.

It was 1.6 ppm and was out of the range of the regulation. Further, its TOC was 10 ppm.

EXAMPLE 3

(1) Preparation of a hydrophilic hollow fiber membrane

A solution containing 13 weight parts of a polysulfone, 25.5 weight parts of propylene glycol and 61.5 weight parts of N-methyl-2-pyrrolidone, which was kept at 85° C., was extruded through a double tube-like nozzle with an aqueous solution of 70 weight % N-methyl-2-pyrrolidone, and a hollow fiber, which had a 340 $\mu$m inner diameter, a 440 $\mu$m outer diameter and a 0.2 $\mu$m pore size, was obtained. A bundle of 2800 hollow fibers, 30 cm in length was washed with a hot water until a residue of the solvents became about below 5 ppm. This hollow fiber was made hydrophilic with the HPMC as done in Example 1.

(2) Measurement of leaching substances, filtering speed and diffusion flow of air These properties were evaluated as in the same manner in Example 1. The nearly same results as in Example 1 were obtained.

EXPERIMENTAL EXAMPLE 2

Confirmation test of irreversible adsorption

After immersing the hydrophilic membranes prepared in Examples 1, 2 and 3 into a pressurized hot water of 135° C. for one hour and drying, a filtering speed and a diffusion flow of air were measured as done in Example 1. The obtained values were not changed as compared with these before the treatment. Judging from these results, it was confirmed that the HPMC did not detach from hollow fibers.

COMPARATIVE EXAMPLE 2

Hollow fibers were prepared in the same manner as in Example 3 except the use of a 500 ppm aqueous solution of a hydroxy propyl cellulose of 62% hydroxy propyl and a number average molecular weight of 11000. Not only the filtering speed of hollow fibers was low, but also an amount of an air flow was too large to be measured. From these results, it was judged that the hydroxy propyl cellulose did not adhere completely to all surface of the polysulfone membrane.

INDUSTRIAL APPLICABILITY

Since an amount of leaching substances from the hydrophilic membranes of this invention is extremely small, they can be applied in the fields where even a quite little leachate is prohibited. Moreover, since the molecular weight of hydrophilic cellulose derivatives used in this invention is small, the method of this invention can be applied for making hydrophilic a hydrophobic membrane of a small pore size without clogging.

What is claimed is:

1. A hydrophilic membrane wherein a hydrophilic cellulose derivative of a number average molecular weight of 2000–8000 is irreversibly adsorbed to a hydrophobic membrane of an aromatic polymer.

2. A hydrophilic membrane as claimed in claim 1, wherein the hydrophobic membrane of an aromatic polymer is a membrane of a polysulfone.

3. A hydrophilic membrane as claimed in claim 1 or 2, wherein the hydrophilic cellulose derivative is hydroxy propyl methyl cellulose.

4. A method for producing a hydrophilic membrane which comprises the steps of impregnating a hydrophobic membrane of an aromatic polymer with a solution containing a hydrophilic cellulose derivative having a number average molecular weight of 2000–8000, and washing the resulting membrane.

5. A hydrophilic membrane as claimed in claim 1, wherein the hydrophilic cellulose derivative has a substitution of not more than 40% and not less than 10%.

6. A method for producing a hydrophilic membrane as claimed in claim 4, wherein the hydrophobic membrane is a membrane of a polysulfone.

7. A method for producing a hydrophilic membrane as claimed in claim 4, wherein the hydrophilic cellulose derivative is hydroxy propyl methyl cellulose.

8. A method for producing a hydrophilic membrane as claimed in claim 4, wherein, prior to adsorbing the hydrophilic cellulose is fractionated to remove undissolved components.

9. A method for producing a hydrophilic membrane as claimed in claim 4, wherein the hydrophilic cellulose derivative has a substitution of not more than 40% and not less than 10%.

* * * * *